US011866966B2

(12) United States Patent
Santo

(10) Patent No.: US 11,866,966 B2
(45) Date of Patent: Jan. 9, 2024

(54) DEVICE FOR CONSTRAINING THE OPENING OF DOORS OR WINDOWS

(71) Applicant: GIESSE S.P.A., Budrio (IT)

(72) Inventor: Peter Reginald Santo, Stockport (GB)

(73) Assignee: GIESSE S.P.A., Budrio (IT)

( * ) Notice: Subject to any disclaimer, the term of this patent is extended or adjusted under 35 U.S.C. 154(b) by 154 days.

(21) Appl. No.: 17/534,451

(22) Filed: Nov. 23, 2021

(65) Prior Publication Data

US 2022/0162890 A1 May 26, 2022

(30) Foreign Application Priority Data

Nov. 25, 2020 (IT) ........................ 102020000028376

(51) Int. Cl.
*E05C 17/28* (2006.01)
*E05C 9/00* (2006.01)

(52) U.S. Cl.
CPC ................ *E05C 17/28* (2013.01); *E05C 9/00* (2013.01)

(58) Field of Classification Search
CPC .......... E05C 17/28; E05C 17/24; E05C 17/30; E05C 17/36; E05C 17/085; E05C 17/04; E05C 9/00; Y10S 292/15
See application file for complete search history.

(56) References Cited

U.S. PATENT DOCUMENTS 2,095,671 A * 10/1937 McWhirter ............. E05C 17/28 292/272
2,277,316 A * 3/1942 Garrison ............... E05F 1/1008 16/49

(Continued)

FOREIGN PATENT DOCUMENTS

DE 338646 C * 6/1921 ............. E05C 17/30
DE 3806662 A * 9/1988 ............. E05C 17/28

(Continued)

OTHER PUBLICATIONS

Italian Search Report dated Sep. 29, 2021 from counterpart Italian Patent Application No. 2020000028376.

*Primary Examiner* — Christine M Mills
*Assistant Examiner* — Faria F Ahmad
(74) *Attorney, Agent, or Firm* — Timothy J. Klima; SHUTTLEWORTH & INGERSOLL PLC

(57) ABSTRACT

Described is a device for constraining the opening of doors or windows comprising a guide body associated with a perimeter profile of a movable leaf and equipped with a slot; an operating arm articulated, at a first end, to a fixed frame, and a second end slidably connectable, by a pin, inside the slot of the guide body so as to allow a sliding stroke of the pin along the guide slot to define an open configuration with a limited angle of the leaf; the guide body is provided with two lateral openings facing each other made on the walls defining the slot to allow a free passage, through one of the openings, of the pin of the arm housed in the slot when the leaf is in a free open configuration; a locking lever or latch articulated to a base of the guide body and configured for locking the pin of the arm when it is positioned at an end of the slot of the guide body in the open configuration with a limited angle of the leaf; an operating rod slidably inserted along the body and having a pair of protruding walls configured to temporarily close, in use, the openings of the slot at least at the passage from the closed configuration to the open configuration at a limited angle of the leaf.

11 Claims, 6 Drawing Sheets

(56) References Cited

U.S. PATENT DOCUMENTS 2,497,830 A * 2/1950 Bernhard ................ E05C 17/28 292/76
2,593,312 A * 4/1952 Joseph .................. E05C 17/085 74/540
2,958,089 A * 11/1960 Roehm ................... E05C 17/24 16/49
2,961,234 A * 11/1960 Munro .................... E05C 17/24 49/346
3,601,842 A * 8/1971 Morrison ................ E05C 17/28 16/49
3,630,560 A * 12/1971 Atkins .................... E05C 17/28 292/DIG. 19
4,042,266 A * 8/1977 Anderberg .............. E05C 17/30 292/DIG. 33
4,087,883 A * 5/1978 Amdal .................... E05C 17/30 292/262
4,750,236 A * 6/1988 Teague, Jr. .............. E05C 17/28 292/270
4,751,766 A * 6/1988 Fahs ....................... E05C 17/28 16/86 A
4,858,272 A * 8/1989 Ogawa .................... E05F 3/221 16/80
4,932,695 A * 6/1990 Pettit ..................... E05C 17/085 292/DIG. 43
4,955,159 A * 9/1990 Rogers .................... E05D 15/22 49/176
4,958,867 A * 9/1990 Champagne ............ D06F 39/14 292/259 R
4,984,331 A * 1/1991 Hucknall ................ E05C 17/30 16/323
5,002,320 A * 3/1991 Richardson ............. E05C 17/30 292/277
5,217,267 A * 6/1993 Yagi ...................... E05C 17/085 217/60 F
5,419,165 A * 5/1995 Perkins ................. E05B 67/383 292/288
5,865,485 A * 2/1999 Lawhorne, Jr. ....... E05C 19/003 292/288
5,906,026 A * 5/1999 Junttila ................... E05F 3/221 16/85
6,253,417 B1 * 7/2001 Rusiana .................. E05C 17/28 16/85
6,347,817 B1 * 2/2002 Chou ......................... B60P 7/15 292/DIG. 60
2012/0036781 A1 * 2/2012 Runk ...................... E05C 17/28 49/181
2014/0223692 A1 * 8/2014 Adoline ................ E05F 1/1091 16/72
2016/0194908 A1 * 7/2016 Bishop .................... E05C 17/28 16/337

FOREIGN PATENT DOCUMENTS

DE 102005000195 A1 * 6/2007 ............. E05C 17/24
DE 102011119333 B3 * 7/2012 ........... E05C 17/085
DE 102013113915 A1 * 6/2015 ............. E05C 17/28
DE 202015008146 U1 * 2/2016 ............. E05C 17/30
EP 0770751 A1 5/1997
EP 962614 A2 * 12/1999 ............. E05C 17/28
EP 1462596 A2 * 9/2004 ......... E05D 11/1007
EP 2157267 A1 * 2/2010 ............. E05C 17/28
EP 2169160 A2 * 3/2010 ............. E05C 17/28
EP 2434078 A2 * 3/2012 ............. E05C 17/28
EP 2927404 A1 10/2015
EP 3034728 A1 6/2016
EP 3363976 A1 8/2018
EP 3702562 A1 9/2020
FR 2520038 A1 7/1983
GB 2319559 A * 5/1998 ............. E05C 17/28
GB 2334548 A * 8/1999 ............. E05C 17/28
WO WO-2004083577 A1 * 9/2004 ............. E05C 17/30
WO WO-2006137352 A1 * 12/2006 ............. E05C 17/30

* cited by examiner

DEVICE FOR CONSTRAINING THE OPENING OF DOORS OR WINDOWS

This application claims priority to Italian Patent Application 102020000028376 filed Nov. 25, 2020, the entirety of which is incorporated by reference herein.

BACKGROUND OF THE INVENTION

This invention relates to a device for constraining the opening of doors or windows, in particular for doors or windows with a traditional leaf-type opening.

Amongst the various types of doors and windows (made of metal, PVC or the like) present on the market, one of these is a door or window with a conventional leaf-type opening (towards the inside or outside of the room in which it is mounted) with the possibility of two different leaf-type opening configurations, one with a free opening angle and one with a limited angle of opening and locked in the open position.

This type of door or window has:

- a fixed frame;
- a movable frame or leaf equipped, on one side, with hinges for its movement between a closed configuration, in stable contact with the fixed frame, and an open configuration, wherein the leaf is moved away from the fixed frame;
- a control handle associated with the leaf;
- operating means mounted on the leaf, connected to the handle, and configured to move, under the action of the handle, devices for closing/opening the leaf in conjunction with striker elements positioned on the fixed frame.

The operating means usually comprise drive rods slidably positioned in channels present on the perimeter profile of the frame and on which pins and/or bosses are associated.

The movement of the rods allows the pins and/or bosses to move into contact with or away from the striker elements to obtain the closed or open configuration of the movable leaf.

In this base configuration, the door or window according to the invention comprises a selector device which is able to add an open configuration constraining the angle of opening of the leaf, as well as the traditional opening of the leaf.

A prior art selector device of simplified type, disclosed in EP 3 702 562 and EP 3 363 976, comprises:

- a guide body associated with the profile of the movable leaf (preferably on the upper cross-member) equipped with a closed slot;
- an operating arm articulated, at a first end, to an upper cross-member of the fixed frame, whilst the other end of the arm is slidably constrained, by means of a pin, inside the slot of the guide body so as to allow a sliding of the pin along the slot.

When the pin of the arm is inserted in the slot, the user, after having rotated the handle during opening of the leaf, pushes or pulls the leaf and, consequently, slides the pin of the arm along the slot of the guide body from one end to the other until making contact with an elastically compliant shaped profile of the end of the slot in such a way as to lock and stabilise the opening of the leaf in a stable and fixed intermediate position (normally approximately 45° as an opening angle).

To return the leaf to the closed position, the user pushes or pulls the leaf to allow the release of the pin from the shaped profile with consequent freedom of sliding along the slot during rotation of the leaf towards its closing.

The prior art device described above has several drawbacks.

The slot with a closed perimeter of the guide body does not allow, when the pin is engaged in the slot, a free opening of the leaf. In order to open the leaf freely, the user must physically remove the pin from the slot.

This structure of the device does not therefore allow automatic selection of the two possible open configurations of the leaf.

Moreover, the interference block of the pin in the elastically compliant shaped profile has reduced reliability over time due to wear of the profile.

SUMMARY OF THE INVENTION

The aim of the invention is to provide a device for constraining the opening of doors or windows which overcomes the prior art drawbacks described above.

In particular, the aim of the invention is to provide a device for constraining the opening of doors or windows which is able to obtain the free open and constrained open configurations of the leaf automatically and by means of the operating handle.

A further aim of the invention is to provide a device for constraining the opening of doors and windows which is able to maintain a high level of precision in the positioning of the leaf in the constrained open configuration and a high level of safety in maintaining the constrained open configuration.

Said aims are fully achieved by a device for constraining the opening of doors or windows according to the invention as characterised in the appended claims.

BRIEF DESCRIPTION OF THE DRAWINGS

The main features of the invention will become more apparent from the following detailed description of a preferred, non-limiting embodiment, illustrated purely by way of example in the accompanying drawings, in which.

DESCRIPTION OF THE PREFERRED EMBODIMENTS

Figure 1:
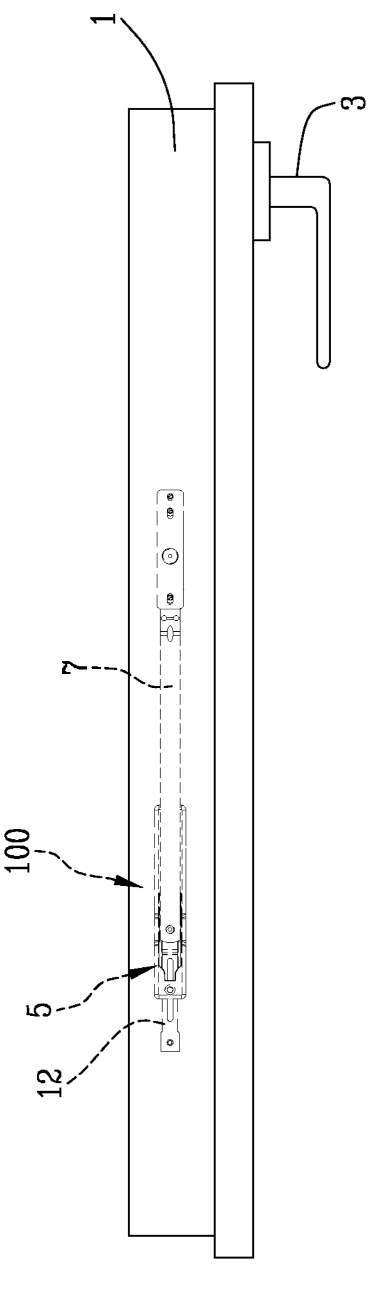
FIGS. 1 and 2 are schematic top plan views of a door or window equipped with the opening constraining device according to the invention, in a closed configuration and in an open configuration with a limited angle, respectively.
Figure 2:
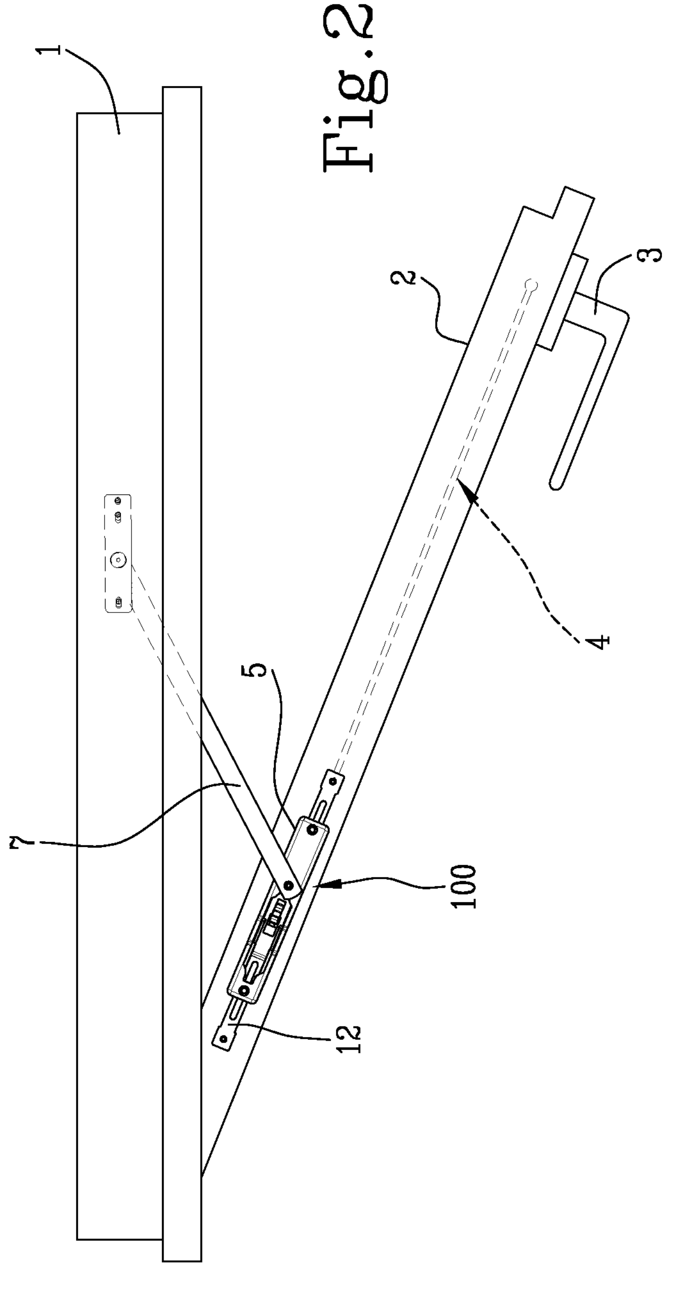

With reference to the accompanying drawings, in particular FIGS. 1 and 2, the device for constraining the opening of doors or windows, labelled 100 in its entirety, is applied on doors or windows which open towards the inside of the room or towards the outside of the room in which they are mounted.

The door or window comprises a fixed frame 1, a movable frame or leaf 2 normally connected to the fixed frame with two or more hinges on an upright (not illustrated) to allow the rotation for opening and closing of the leaf 2.

The door or window also comprises a control handle 3 associated with the leaf 2.

The handle 3 is connected to devices 4 for locking/unlocking the leaf 2 slidably positioned along the perimeter profile of the leaf 2 to allow, by rotating the handle 3, at least one closed configuration of the leaf 2 and a free open configuration of the leaf 3.

The locking/unlocking devices 4 comprise drive rods (illustrated by the dashed line) slidably positioned in channels present on the perimeter profile of the movable leaf and on which pins and/or bosses are associated.

The movement of the rods allows the pins and/or bosses to move into contact with or away from striker elements located on the fixed frame to obtain the closed or open configuration of the movable leaf.

The constraining device 100 comprises a guide body 5 associated with the perimeter profile of the movable leaf 2 and equipped with a slot 6 (at closed ends).

The constraining device 100 also comprises an operating arm 7 articulated, at a first end, to the fixed frame 1, and a second end slidably connectable, by means of a pin 8, inside the slot 6 of the guide body 5 so as to allow a sliding stroke of the pin 8 along the guide slot 6 to define an open configuration with a limited angle of the leaf 2 (see FIG. 2).

As illustrated (see also FIGS. 3 to 12), the constraining device 100 comprises the guide body 5 provided with two lateral openings 9 facing each other made on the walls defining the slot 6 to allow a free passage, at least through one of the openings 9, of the pin 8 of the arm 7 housed in the slot 6 when the leaf 2 is in the free open configuration.

Moreover, the constraining device 100 comprises a locking lever or latch 10 articulated to a base 11 of the guide body 5 and movable between a first lowered non-operating position (FIGS. 4, 5 and 7 and 13) and a second raised operating position (FIGS. 3, 6, 11 and 14) for locking the pin 8 of the arm 7 when it is positioned at an end of the slot 6 of the guide body 5 in the open configuration with a limited angle of the leaf 2.

The constraining device 100 also comprises an operating rod 12 slidably inserted along the guide body 6 and having its ends, outside the guide body 6, configured to connect, in use, to the devices 4 for locking/unlocking the movable leaf 2.

The rod 12 has a pair of protruding walls 12*a* configured to temporarily close, in use, the openings 9 of the slot 6 at least at the passage from the closed configuration to the open configuration with a limited angle of the leaf 2.

Thanks to this structure, the leaf can be opened in the two configurations quickly and precisely by means of the handle and without intervening, if necessary, on the components of the device, which always remain positioned on the leaf also for the free opening (thanks to the presence of the openings in the slot—as described in more detail below) and, thanks to the latch controlled by the rod, the leaf is stably locked in (and released from) the open position with a constrained angle always under direct control of the handle.

In light of this, the outer ends of the rod 12 are connected, by pins, to the movement rods connected to the handle 3 so that they can slide in both directions and obtain the different configurations required.

Preferably, the operating rod 12 has a relative portion, inside the guide body 6, provided with a slot-shaped opening 13 (see also FIGS. 9 to 14) configured to intercept, during its sliding and under the action of the handle 3, a cam profile made on the latch 10 in such a way as to allow the guided passage of the latch 10 from the lowered non-operating position to the raised operating position at least at the open position with a limited angle of the leaf 2.

The constraining device 10 comprises an elastic element 15 interposed between the base 11 of the guide body 6 and the latch 10 and able to keep the latch 10 pushed in the direction of the raised operating position.

The elastic element 15 may be a spring interposed between the latch 10, having a suitable seat 10*a*, whilst the base 11 has a pin on which the spring is fitted.

It should be noted that the operating rod 12 has a central zone 16 raised relative to its ends in such a way as to be inserted, without friction and with the possibility of sliding, between a sliding plane of the pin 8 of the arm 7 in the slot 6 of the guide body 5 and a seat 17 for receiving the latch 10 made in the guide body 6.

Preferably (see FIGS. 13 and 14), the operating rod 12 has the above-mentioned slot-shaped opening 13 divided into two consecutive stretches 13*a*, 13*b* of which a first stretch 13*a* has a width L13*a* which is less than the width L10 of the latch 10 in such a way as to be in contact with the guide cam profiles of the latch 10 and a second stretch 13*b* with a width L13*b* which is greater than the width of the latch 10 to allow a part of the latch 10 to reach the raised operating position beyond the operating rod 12.

It should be noted that the operating rod 12 has the two walls 12*a* for closing the openings 9 of the slot 6 protruding transversely from the raised central portion 16 in such a way as to be positioned parallel to the openings 9 of the slot for their closing, when required.

Preferably, the latch 10 has a head end 18 having a wedge-shaped profile configured for contact, in use, with the pin 8 at the open position with a limited angle of the leaf 2.

The profile of the head 18 therefore has two surfaces which have a central vertex which acts as a point of contact with the pin 8 during locking of the pin. The surfaces of the head are designed to allow both the lifting without immediate connection between the head and the pin, and the lowering without locking between the head and the pin.

The latch 10 has two lateral wings 14 having a corresponding surface for contact with the operating rod 12 with an inclined extension towards the base 11 of the guide body 6 in such a way as to define the guide cam profiles for the latch 10 at the passage from the non-operating position to the operating position and vice versa.

In other words, the latch 10 always has a guided movement controlled by the sliding of the rod 12.

It should be noted the guide body 6 has a seat 18 for housing the latch 10 equipped with a pin 19 for articulation of the latch 10 to allow its rotation from the non-operating position to the operating position and vice versa.

Figure 3:
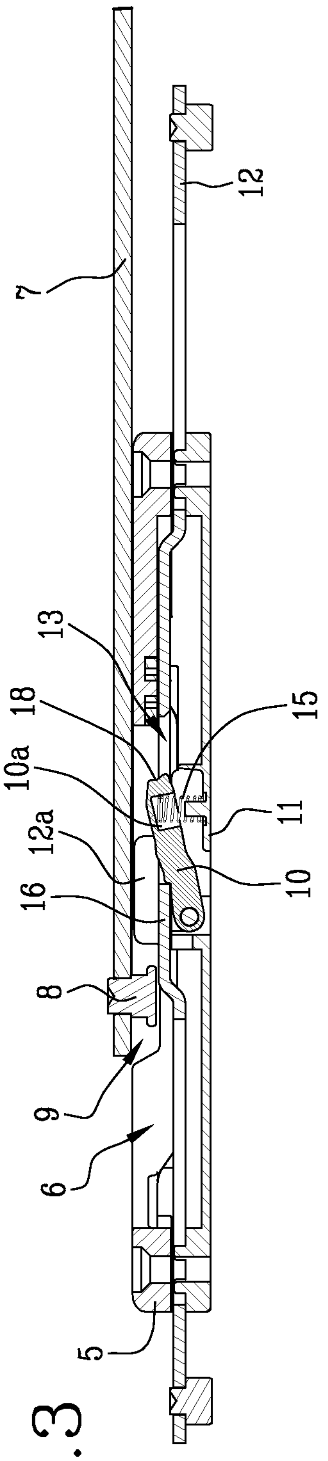
FIGS. 3 to 7 are all corresponding side views in cross-section illustrating the device for constraining the opening of the door or window in five different operating configurations.
Figure 4:
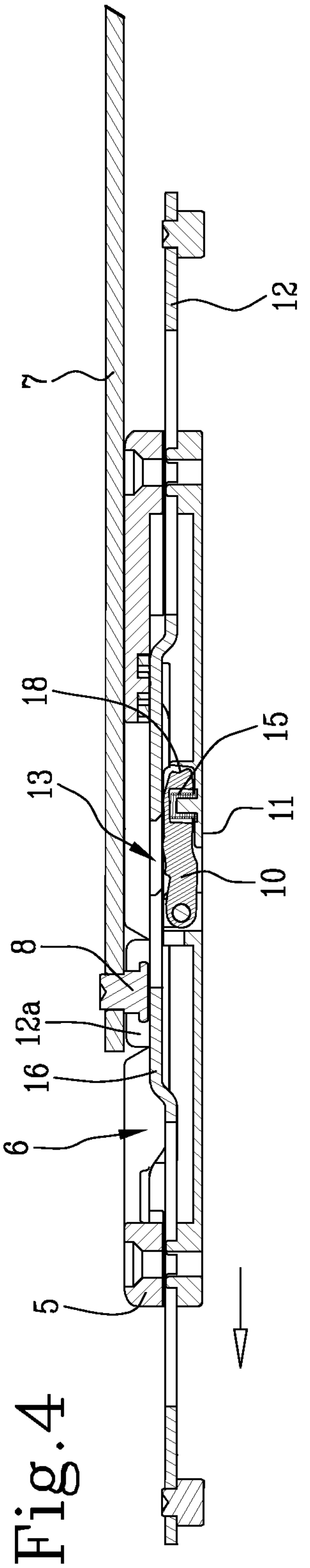
Figure 5:
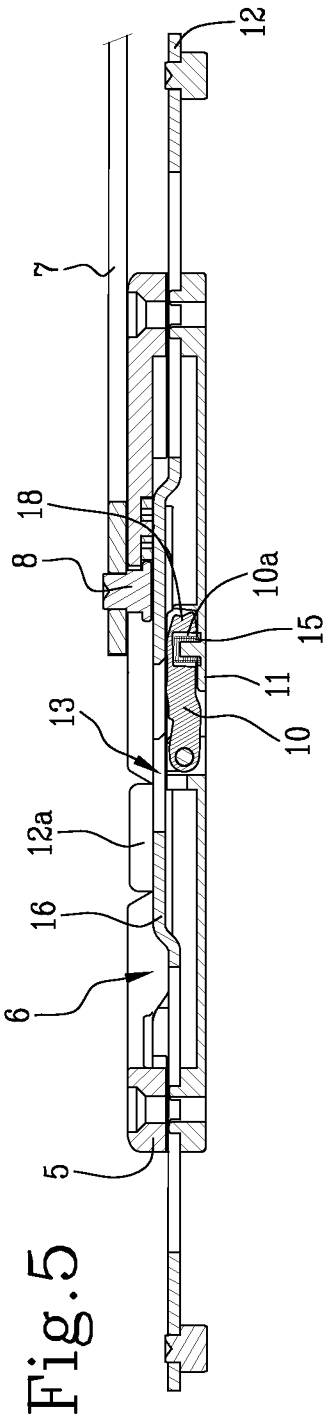
Figure 6:
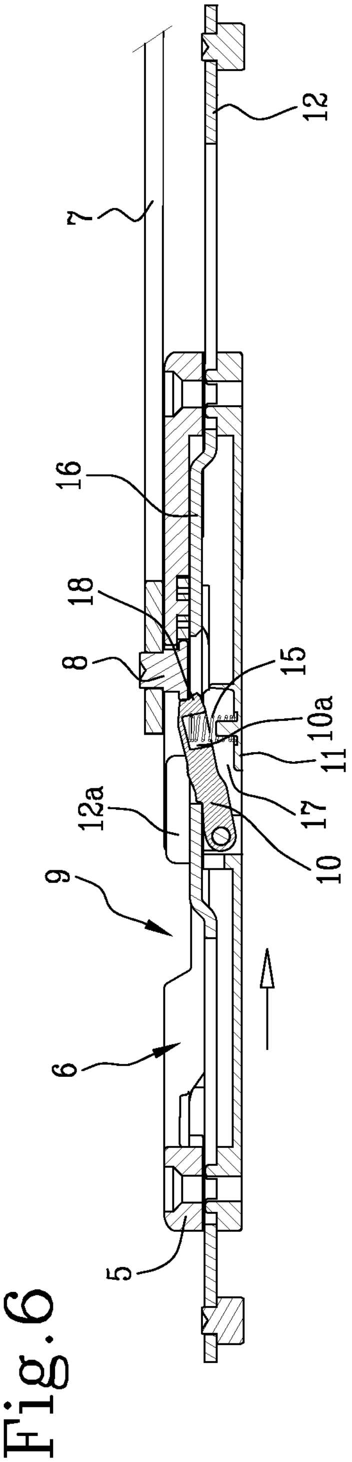
Figure 8:
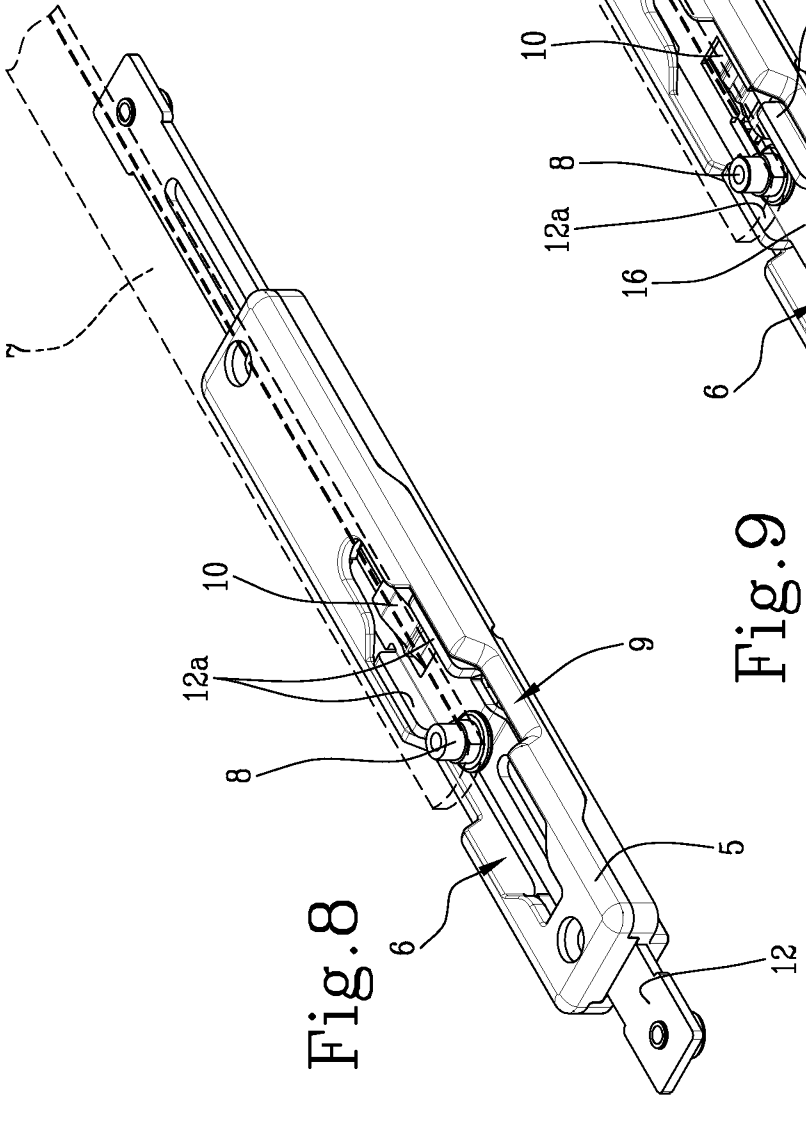
FIGS. 8 to 12 are corresponding perspective views illustrating the device for constraining the opening of the door or window in the five different operating configurations of FIGS. 3 to 7.
Figure 9:
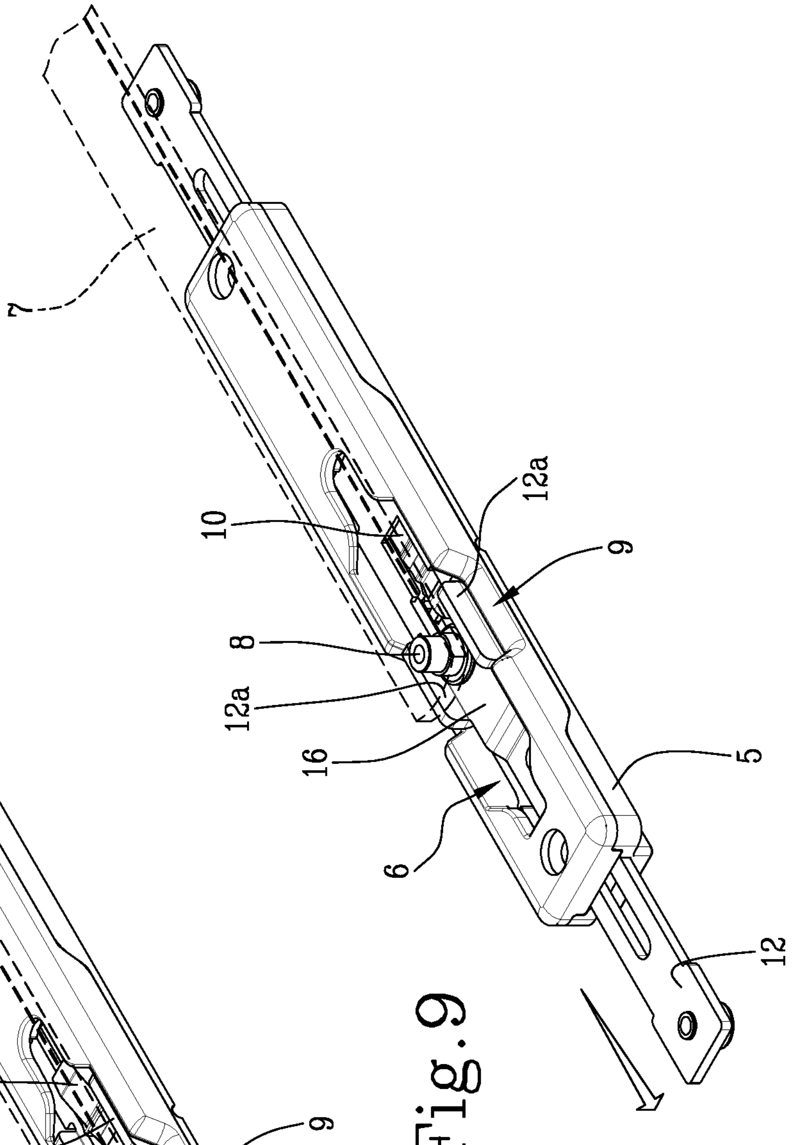
Figures 10, 11, 12:
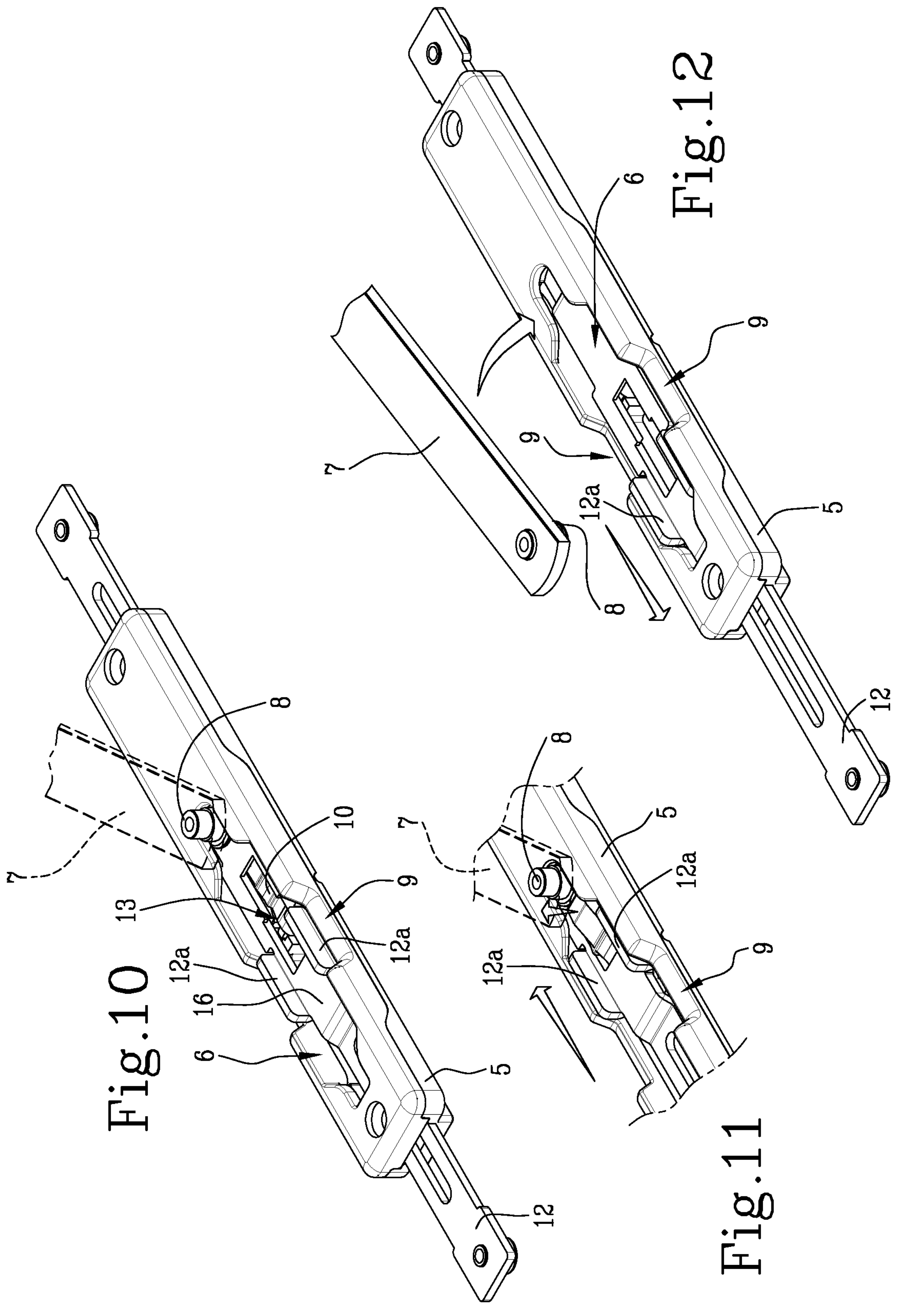
Figure 14:
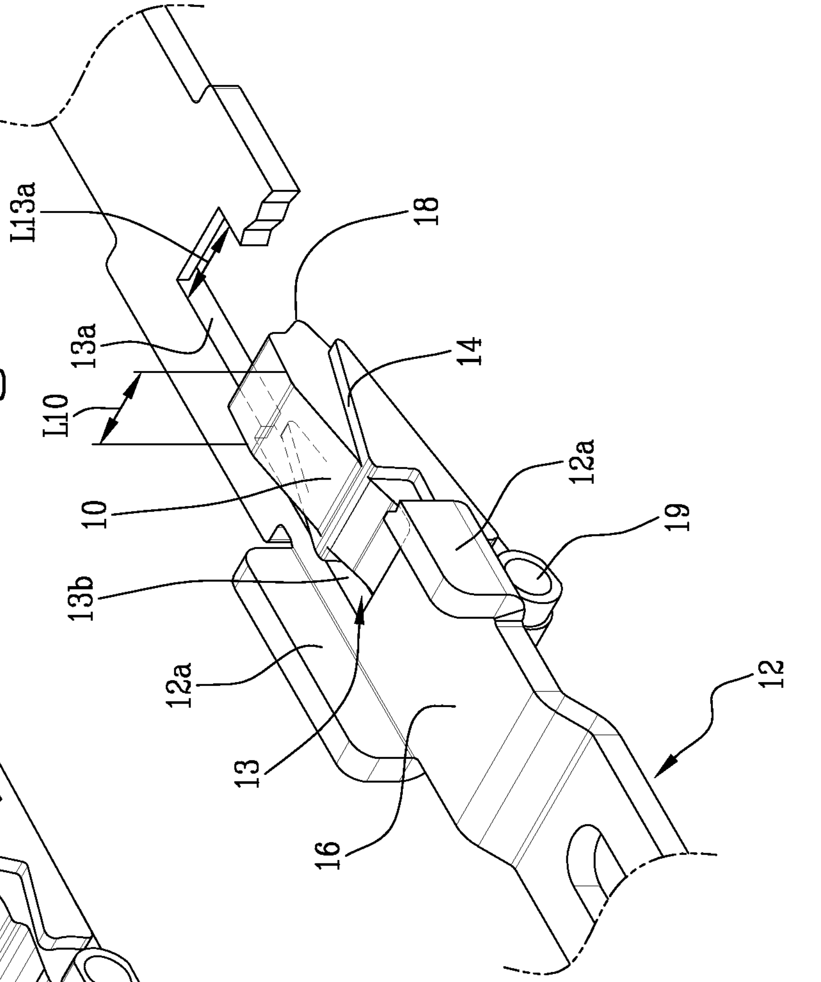
FIGS. 13 and 14 are both perspective views, with some parts cut away in order to better illustrate others, of a partial detail of the opening constraining device, in particular an operating rod and a latch in two different operating positions.
Figure 13:
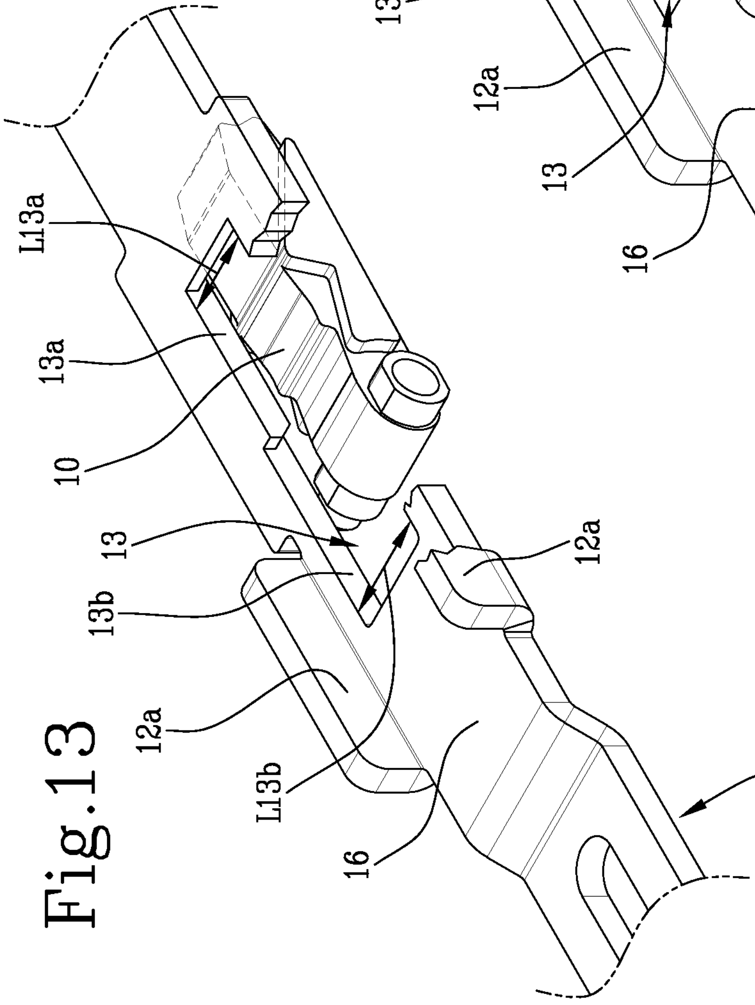

It should be noted the operating rod 12 is connected, by means of the locking/unlocking devices 4, to the control handle 3 in such a way as to slide in coordination with the rotations of the handle 3 to obtain at least the open position with a limited angle according to positions between:

a closed position of the leaf 2 corresponding to a first position of the handle 3 (position 0°), wherein the rod 12 is in a first position with the walls 12*a* away from the openings 9 of the slot 6 of the guide body 5 and the latch 10 is in the raised operating position (FIGS. 3 and 8);

a rotation of the handle 3 in an open position with a limited angle of the leaf 2 (position 90°), wherein the rod 12 is in a second position in which the walls 12*a* are in a closed position of the openings 9 of the slot 6 of the guide body 5 and the latch 10 is in the lowered non-operating position in such a way as to allow the pin 8 of the arm 7 to slide along the slot 6 to obtain the opening of the leaf 2 with a limited angle (FIGS. 4, 5, 9 and 10);

a return rotation of the handle 3 to the closed position of the leaf 2, wherein the rod 12 returns to the first position with the walls 12*a* away from the openings 9 of the slot 6 of the guide body 5 and the latch 10 is in the raised operating position in such a way as to lock the pin 8 of the arm 7 in the position reached (FIGS. 6 and 11);

a further rotation of the handle 3 to the open position with a limited angle of the leaf 2, wherein the rod 12 returns to the second position in which the walls 12*a* close the openings 9 of the slot 6 of the guide body 5 and the latch 10 is in the lowered non-operating position in such a way as to allow the pin 8 of the arm 7 to slide along the slot 6 to allow the leaf 2 to return to the closed position.

Figure 7:
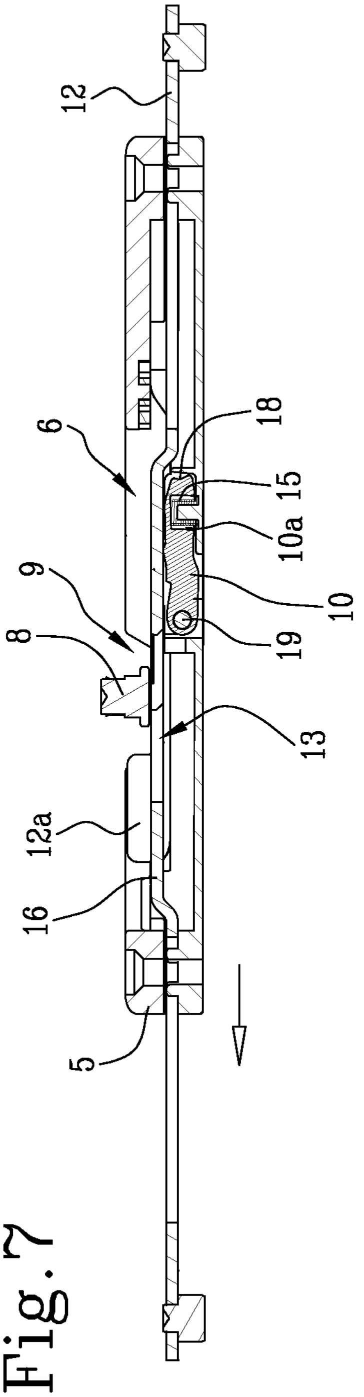

In addition to these positions, the operating rod 12, by means of the control handle 3, slides in coordination with the rotations of the handle 3 also to obtain the free open position of the leaf between:

the closed position of the leaf 2 corresponding to the first position of the handle 3, wherein the rod 12 is in the first position with the walls 12*a* away from the openings 9 of the slot 6 of the guide body 5 and the latch 10 is in the raised operating position;

a second rotation of the handle 3 angularly different from its first rotation (position) 180°, wherein the rod 12 is in a third position with the walls 12*a* away from the openings 9 of the slot 6 of the guide body 5 and the latch 10 is in the lowered non-operating position, in such a way as to rotate the leaf 2 whilst keeping the arm 7 and the pin 8 stationary inside the fixed frame 1 (FIGS. 7 and 12).

In the latter configuration, the walls 9 are moved in the opposite direction to the position they adopt in the closed position of the rod.

The open zone of the slot therefore ensures that the leaf opens (and closes) without interaction with the pin which remains (together with the rod) positioned parallel inside the profile of the cross-member of the fixed frame.

The preset aims are achieved thanks to a device structured in this way.

The combination between the rod with slotted opening, vertical walls and latch makes it possible to obtain an operating precision and safety between the various positions required.

The opening in the slot of the guide body allows traditional opening of the leaf to be obtained without intervening on the components already mounted.

The rod with the structure passing bilaterally in the body and connected to the locking/unlocking devices allows all the operating connections present along the profile to be maintained (irrespective of the position in which the device is positioned) without necessarily having to modify the locking/unlocking structures of the door or window.

What is claimed is:

1. A device for constraining the opening of doors or windows comprising:

a fixed frame, a movable frame or leaf, a control handle connected to the movable frame or leaf; the control handle being connected to devices for locking/unlocking the movable frame or leaf slidably positioned along a perimeter profile of the movable frame or leaf to allow, by rotating the control handle, at least a closed configuration of the movable frame or leaf and a free opening configuration of the movable frame or leaf, a constraining device comprising:

a guide body connected to the perimeter profile of the movable frame or leaf and having a slot;

an operating arm articulated, at a first end, to the fixed frame, and including a second end slidably connectable, by a pin, inside the slot of the guide body to allow a sliding stroke of the pin along the slot to define a limited opening configuration with a limited angle of the movable frame or leaf;

the guide body including two lateral openings facing each other made on the guide body walls defining the slot to allow a passage, at least through one of the two lateral openings, of the pin of the arm housed in the slot when the movable frame or leaf is in the free opening configuration;

a latch articulated to a base of the guide body and movable between a first, lowered non-operating position and a second, raised operating position for locking the pin of the arm when the pin is positioned at an end of the slot of the guide body in the limited opening configuration with the limited angle of the movable frame or leaf;

an operating rod slidably inserted along the guide body and having outer ends, outside the guide body, configured to connect, in use, with the devices for locking/unlocking the movable frame or leaf; the operating rod having two protruding rod walls configured to temporarily close, in use, the two lateral openings of the slot at least at the passage from the closed configuration to the limited opening configuration with the limited angle of the movable frame or leaf.

2. The device according to claim 1, wherein the operating rod has a relative portion, inside the guide body, including a slot-shaped opening configured to intercept, during sliding of the operating rod and under action of the control handle, a cam profile made on the latch to allow guided passage of the latch from the first, lowered non-operating position to the second, raised operating position at least at the limited opening configuration with the limited angle of the movable frame or leaf.

3. The device according to claim 1, comprising an elastic element interposed between the base of the guide body and the latch and able to keep the latch pushed in the direction of the second, raised operating position.

4. The device according to claim 1, wherein the operating rod has a raised central portion raised relative to the outer ends to be inserted, without friction and with the possibility of sliding, between a sliding plane of the pin of the arm in the slot of the guide body and a seat for receiving the latch in the guide body.

5. The device according to claim 1, wherein the latch has a head end having a wedge-shaped profile configured for contact, in use, with the pin in the limited opening configuration with the limited angle of the movable frame or leaf.

6. The device according to claim 2, wherein the latch has two lateral wings having a corresponding surface for contact with the operating rod with an inclined extension towards the base of the guide body to define the cam profile for the latch at the passage from the first, lowered non-operating position to the second, raised operating position and vice versa.

7. The device according to claim 2, wherein the operating rod has the slot-shaped opening divided into two consecutive stretches of which a first stretch having a width which is less than the width of the latch to be in contact with the cam profile of the latch and a second stretch having a width which is greater than the width of the latch to allow a part of the latch to reach the second, raised operating position beyond the operating rod.

8. The device according to claim 1, wherein the guide body has a seat for housing the latch equipped with a pin for articulation of the latch to allow rotation of the latch from the first, lowered non-operating position to the second, raised operating position and vice versa.

9. The device according to claim 4, wherein the operating rod has the two protruding rod walls for closing the two lateral openings of the slot, the two protruding rod walls protruding transversely from the raised central portion to be positioned parallel to the two lateral openings of the slot for closing the slot, when required.

10. The device according to claim 1, wherein the operating rod is connected, by the devices for locking/unlocking, to the control handle to slide in coordination with the rotations of the control handle to obtain at least the limited opening configuration with the limited angle of the movable frame or leaf according to positions between:

a closed position of the movable frame or leaf corresponding to a first position of the control handle, wherein the operating rod is in a first position with the two protruding rod walls away from the two lateral openings of the slot of the guide body and the latch is in the second, raised operating position;

a rotation of the control handle to the limited opening configuration the limited angle of the movable frame or leaf, wherein the operating rod is in a second position in which the two protruding rod walls are in a closed position of the two lateral openings of the slot of the guide body and the latch is in the first, lowered non-operating position to allow the pin of the arm to slide along the slot to obtain the limited opening configuration of the movable frame or leaf with the limited angle;

a return rotation of the control handle to the closed position of the movable frame or leaf, wherein the operating rod returns to the first position with the two protruding rod walls away from the two lateral openings of the slot of the guide body and the latch is in the second, raised operating position to lock the pin of the arm in the position reached;

a further rotation of the control handle to the limited opening configuration with the limited angle of the movable frame or leaf, wherein the operating rod returns to the second position in which the two protruding rod walls close the two lateral openings of the slot of the guide body and the latch is in the first, lowered non-operating position to allow the pin of the arm to slide along the slot, in the opposite direction, to allow the movable frame or leaf to return to the closed position.

11. The device according to claim 10, wherein the operating rod is connected, by the devices for locking/unlocking to the control handle to slide in coordination with the rotations of the control handle to obtain the free opening configuration of the movable frame or leaf between:

the closed position of the movable frame or leaf corresponding to the first position of the control handle, wherein the operating rod is in the first position with the two protruding rod walls away from the two lateral openings of the slot of the guide body and the latch is in the second, raised operating position;

a second rotation of the control handle angularly different from a first rotation, wherein the operating rod is in a third position with the two protruding rod walls away from the two lateral openings of the slot of the guide body and the latch is in the first lowered non-operating position, to rotate the movable frame or leaf whilst keeping the arm and the pin stationary inside the fixed frame.

* * * * *